United States Patent Office 3,845,140
Patented Oct. 29, 1974

3,845,140
OXIDATION OF SECONDARY AND TERTIARY
ALKYL AROMATIC HYDROCARBONS
Arthur M. Brownstein, Cherry Hill, N.J., and David L. Kerr, Wilmington, Del., assignors to Sun Research and Development Co., Philadelphia, Pa.
No Drawing. Continuation of application Ser. No. 709,786, Mar. 1, 1968. This application Mar. 10, 1970, Ser. No. 17,048
Int. Cl. C07c 73/08
U.S. Cl. 260—610 B
10 Claims

ABSTRACT OF THE DISCLOSURE

Cuprous halide which has been activated by contact with an aromatic heterocyclic amine is found to be an effective catalyst for increasing the rate of oxidation of secondary and tertiary alkyl aromatic hydrocarbons such as cumene or ethylbenzene to form the corresponding hydroperoxide.

CROSS-REFERENCE TO RELATED APPLICATION

This application is a continuation of U.S. Ser. No. 709,786, filed Mar. 1, 1968, in the name of Arthur M. Brownstein and David L. Kerr.

BACKGROUND OF THE INVENTION

This invention relates to a process for the oxidation of secondary and tertiary alkyl aromatic hydrocarbons to form the corresponding hydroperoxide. More particularly, this invention is directed to increasing the rate of oxidation of such compounds as cumene or ethylbenzene to form the corresponding hydroperoxide compound, wherein there is employed as the oxidation catalyst a metallo-organic complex formed by reacting a cuprous halide with an aromatic heterocyclic amine.

It is known that cumyl hydroperoxide can be produced very slowly by auto-oxidation when air or oxygen is rapidly passed through cumene warmed to about 80° C. Also, Canadian Pat. No. 510,517 teaches that the rate of oxidation of cumene can be enhanced when carried out in the presence of alkali or alkaline earth metal oxides or hydroxides, or in the presence of salts and oxides of heavy metals. Under these conditions, the conversion rate is only about 2–3% per hour.

The oxidation of cumene using metallic copper as the oxidation catalyst is taught by U.S. Pat. 2,749,368. There is no teaching or suggestion in this patent of the use of copper salts together with an amine as an oxidation catalyst.

SUMMARY OF THE INVENTION

It has now been found, in accordance with the present invention, that secondary and tertiary alkyl aromatic hydrocarbons can be oxidized at effective rates of conversion to form the corresponding hydroperoxides when a complex formed by reacting a cuprous halide with an aromatic heterocyclic amine is employed as the oxidation catalyst.

DESCRIPTION OF THE PREFERRED EMBODIMENTS

The cuprous halide-amine catalyst may readily be prepared in accordance with the teachings contained in U.S. Pat. 3,219,625, as, for example, by reacting a cuprous halide with an excess of an aromatic heterocyclic amine such as pyridine, quinoline, isoquinoline, triazine, pyrazine or the like, and thereafter recovering the resultant complex from solution. Alternatively, and more preferably, the catalyst may be prepared in situ by adding a slight excess of amine to the cuprous halide in the reaction medium. The cuprous halide may be cuprous bromide or iodide, but is preferably cuprous chloride.

While the weight ratio of cuprous halide to heterocyclic amine is not critical, it is desirable that the catalyst contains from about 1 to 100 parts by weight of cuprous halide for each 100 parts of amine, and preferably from 5 to 30 by weight of cuprous halide, in order to provide optimum effectiveness.

The secondary and tertiary alkyl aromatic hydrocarbons employed as the starting materials in the process of this invention have the following structural formula:

wherein R is lower alkyl; $R_1$ is lower alkyl or hydrogen; Ar is a substituted or unsubstituted aromatic nucleus such as phenyl or naphthyl; and R and $R_1$ taken together form a cycloalkyl ring having from 4 to 7 carbon atoms; and wherein R and $R_1$ may be the same or different alkyl groups. The aromatic nucleus may be substituted by such groups as lower alkyl, lower alkoxy, halo, nitro, or cyano radicals. Preferably, the secondary or tertiary alkyl aromatic is represented by such compounds as cumene or ethylbenzene, although it is understood that compounds such as p-diisopropylbenzene, sec.-butylbenzene, isopropylnaphthalene, p-cymene, and the like may also be utilized. Moreover, it has been found that this process is equally effective in oxidizing cycloalkyl aromatics such as phenylcyclohexane. Thus, for purposes of this invention cycloalkyl groups which are substituted for R and $R_1$, taken together, react as tertiary alkyl compounds.

The process of this invention utilizing the aforedescribed catalyst, is conveniently carried out by the rapid passage of oxygen or air through a suitable reactor, to which has first been added a solution of the alkyl aromatic and the cuprous halide-heterocyclic amine catalyst. The air or oxygen should be brought into intimate contact with the liquid phase, for example, by the use of high speed stirrers, suitable nozzles or the like.

The amount of catalyst employed will vary depending upon the nature and amount of material to be oxidized. In general, however, the amount of catalyst may vary from about 0.05 grams to 0.8 grams of catalyst per mole of substrate.

The rate of input of oxygen or air will depend upon the temperature and pressure utilized during the oxidation. There should be provided at least an amount theoretically sufficient to convert the alkyl-substituted aromatic compound completely to the corresponding hydroperoxide, and preferably an excess of this amount. It has been found that a flow rate ranging from 0.5 to 300 liters per hour is generally sufficient for most conversions. Any uncombined oxygen may, of course, be recycled to the reactor. The reaction may be effected at normal or superatmospheric pressure.

The reaction temperature may range from about 80–130° C. but is preferably in the range of 90–115° C. While it has been found that the rate of conversion of substrate to hydroperoxide may initially be increased at temperatures over about 115° C., this is accomplished only at the expense of some of the remaining substrate which is converted into unwanted by-products.

The reaction is generally complete in from 0.5 to 3 hours, depending upon the amount of substrate employed. It is preferred, however, that the reaction be terminated after a period of two to three hours in order to avoid excessive concentration of explosive hydroperoxide, in which case unreacted starting material is readily recovered and recycled to the reactor.

Advantageously, small amounts of the hydroperoxide corresponding to the desired product may be introduced into the reaction medium to act as the reaction initiator. Thus, for example, when cumene is being oxidized, it has been found to be advantageous to add a small amount of cumyl hydroperoxide in order to initiate the reaction.

The resulting hydroperoxide product is readily recovered from the reaction medium by conventional methods. Thus, for example, hydroperovide may be conveniently recovered by isolating it as its sodium salt by addition of concentrated aqueous NaOH to the reaction product.

The hydroperoxides obtained by the process of this invention are highly useful in various important commercial applications. Thus, for example, when cumene is oxidized in accordance with the present invention, there is formed α-cumyl hydroperoxide which, when reacted with an acid such as sulfuric acid, is converted to industrially useful phenol and acetone in accordance with the following reaction.

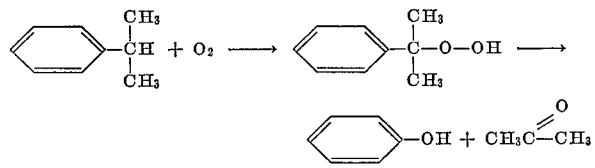

EXAMPLES 1-4

The following four reactions were carried out in a 50 ml. reactor which was fitted with a water-cooled reflux condenser and immersed in a thermostated oil bath which was held at 105° C. The reactor was fitted with a hollow stirrer shaft through which oxygen could be added and dispersed, and the reaction medium was rapidly stirred as the oxygen was added. Oxygen pressure was maintained at about 1 atmosphere by a rapid flow-through of 60 mls. of oxygen per minute.

To this reactor was added, for each of the following runs, cumene (200 mmoles), cumyl hydroperoxide promoter (1 mole percent), and as noted, various quantities of catalyst or, for sake of comparison, the separate components of the catalyst system. The results obtained are reported as follows in Table I:

TABLE I

| Example | Catalyst system | Cumyl hydroperoxide, mole percent of theoretical | | | |
|---|---|---|---|---|---|
| | | 1ᵃ | 2ᵃ | 3ᵃ | 4ᵃ |
| 1 | Pyridine (57 mg.) | 2.05 | 3.95 | | |
| 2 | Cuprous chloride (20 mg.) | 0.60 | 1.70 | | |
| 3 | Cu₂Cl₂ (20 mg.) plus pyridine (57 mg.) | 12.9 | 20.3 | 23.7 | 26.3 |
| 4 | Cu₂Cl₂ (10 mg.) plus pyridine (57 mg.) | 10.9 | 15.9 | 22.5 | 27.2 |

ᵃ Reaction time in hours.

It will be seen from the foregoing results that the rate of conversion provided by the catalyst complex far exceeds the combined rates obtained from each of the two separate catalyst components by a factor of from three to five times of what should be expected.

EXAMPLE 5

The procedure of Examples 1-4 is repeated, substituting 200 mmoles of phenylcyclohexane for cumene. The catalyst consists of 20 mg. Cu₂Cl₂ and 57 mg. pyridine. After four hours phenylcyclohexyl 1-hydroperoxide is obtained.

EXAMPLE 6

The procedure of Example 5 is repeated, substituting 200 mmoles of ethylbenzene for cumene. The catalyst consists of 10 mg. Cu₂Br₂ and 55 mg. of quinoline. After three hours ethylbenzyl hydroperoxide is obtained.

EXAMPLE 7

The procedure of Example 5 is repeated, substituting β-sec.-butylnaphthalene for cumene. The catalyst consists of 20 mg. Cu₂Cl₂ and 60 mg. pyridine. After five hours β-sec.-butylnaphthalene hydroperoxide is obtained.

What is claimed is:

1. In a process for the oxidation of secondary and tertiary alkyl aromatic hydrocarbons with oxygen or an oxygen-containing gas at temperatures of from 80° to 130° C. in the presence of a catalyst to produce the corresponding hydroperoxide compounds, the imporvement which comprises oxidizing said alkyl aromatic hydrocarbons having the formula

in which R is a lower alkyl group having from one to seven carbon atoms; $R_1$ is hydrogen or a lower alkyl group having from one to six carbon atoms; R and $R_1$, taken together, form a cycloalkyl ring having from four to seven carbon atoms; and Ar is phenyl or naphthyl, in the presence of a catalyst comprising a cuprous halide selected from the group consisting of cuprous chloride, cuprous bromide, and cuprous iodide, and an aromatic heterocyclic amine selected from the group consisting of pyridine, quinoline, isoquinoline, triazine and pyrazine, wherein the ratio of cuprous halide to amine is in the range of about 1 to 100 parts by weight of said halide for each 100 parts of amine.

2. The process according to Claim 1 wherein the alkyl aromatic hydrocarbon is cumene.

3. The process according to Claim 1 wherein the alkyl aromatic hydrocarbon is ethylbenzene.

4. The process according to Claim 1 wherein the catalyst is cuprous chloride and pyridine.

5. The process according to Claim 1 wherein the temperature is in the range of from 90 to 115° C.

6. The process according to Claim 1 wherein the oxidation is carried out in the presence of added hydroperoxide.

7. The process according to Claim 1 which comprises oxidizing cumene in the presence of a catalyst comprising cuprous chloride and pyridine to obtain cumyl hydroperoxide.

8. The process according to Claim 1 which comprises oxidizing phenylcyclohexane in the presence of cuprous chloride and pyridine to obtain phenylcyclohexyl 1-hydroperoxide.

9. The process according to Claim 1 which comprises oxidizing ethylbenzene in the presence of cuprous bromide and quinoline to obtain ethylbenzyl hydroperoxide.

10. The process according to Claim 1 which comprises oxidizing β-sec.butylnaphthalene in the presence of cuprous chloride and pyridine to obtain β-sec.-butylnaphthalene hydroperoxide.

References Cited
UNITED STATES PATENTS

| 2,734,086 | 2/1956 | Goppel et al. | 260—610 B |
| 2,430,864 | 1/1947 | Farkas et al. | 260—610 B |
| 2,749,368 | 6/1956 | Fortuia et al. | 260—610 B |

BERNARD HELFIN, Primary Examiner

W. B. LONE, Assistant Examiner